(12) United States Patent
Marache-Francisco et al.

(10) Patent No.: US 10,133,463 B2
(45) Date of Patent: Nov. 20, 2018

(54) SMART RESPONSIVE BEHAVIOR FOR PIXEL-PERFECT DESIGNS

(71) Applicants: Cathie Marache-Francisco, Paris (FR); Kevin Le Fur, Paris (FR)

(72) Inventors: Cathie Marache-Francisco, Paris (FR); Kevin Le Fur, Paris (FR)

(73) Assignee: Business Objects Software, Ltd, Dublin (IE)

( * ) Notice: Subject to any disclaimer, the term of this patent is extended or adjusted under 35 U.S.C. 154(b) by 448 days.

(21) Appl. No.: 14/581,237

(22) Filed: Dec. 23, 2014

(65) Prior Publication Data
US 2016/0179354 A1 Jun. 23, 2016

(51) Int. Cl.
*G06F 3/0484* (2013.01)
*G06F 17/21* (2006.01)

(52) U.S. Cl.
CPC ........ *G06F 3/04847* (2013.01); *G06F 17/211* (2013.01)

(58) Field of Classification Search
CPC ............... G06F 17/2247; G06F 17/212; G06F 17/30905; G06F 3/04847; G06F 17/211; G06F 17/217
See application file for complete search history.

(56) References Cited

U.S. PATENT DOCUMENTS

| | | | | |
|---|---|---|---|---|
| 5,461,707 A * | 10/1995 | O'Gorman | ........... | H04N 1/3935 345/668 |
| 6,016,502 A * | 1/2000 | Haneda | .................. | G06F 3/0481 345/87 |
| 6,976,226 B1 * | 12/2005 | Strong | .............. | G06F 17/30905 715/788 |
| 6,982,729 B1 * | 1/2006 | Lange | ....................... | G09G 5/14 345/3.4 |
| 8,489,469 B1 * | 7/2013 | Elberbaum | ........ | G06Q 30/0643 348/14.07 |
| 9,547,628 B2 * | 1/2017 | Mangalam | ............ | G06F 17/214 |
| 2001/0011364 A1 * | 8/2001 | Stoub | .................... | G06F 17/217 717/100 |
| 2001/0021931 A1 * | 9/2001 | Vaughan | ............. | G06F 17/3071 |

(Continued)

OTHER PUBLICATIONS

Baturay, Meltem Huri., e tal, "Responsive web design: a new type of design for web-based instructional content", 4th International Conference on New Horizons in Education, Procedia—Social and Behavioral Sciences 106 (2013) pp. 2272-2279.

(Continued)

*Primary Examiner* — Tadesse Hailu
(74) *Attorney, Agent, or Firm* — Brake Hughes Bellermann LLP

(57) ABSTRACT

A computer-implemented method for rendering a document on any size device includes, during runtime, rendering a document for display on a device, where the document includes multiple elements arranged in one or more rows and one or more columns. The method includes if a size of the device is greater than a threshold size, scaling the document as a whole to fit the size of the device. If the size of the device is less than the threshold size, scaling the document by stacking the columns containing elements into a single column, removing empty space from the single column, and scaling the elements in the stacked single column.

12 Claims, 7 Drawing Sheets

(56) References Cited

U.S. PATENT DOCUMENTS

| | | | | |
|---|---|---|---|---|
| 2002/0158876 A1* | 10/2002 | Janssen | G06F 17/245 | 345/504 |
| 2003/0179189 A1* | 9/2003 | Lira | G06F 3/0485 | 345/173 |
| 2003/0182628 A1* | 9/2003 | Lira | G06F 3/0485 | 715/252 |
| 2003/0218620 A1* | 11/2003 | Lai | G06T 3/40 | 345/670 |
| 2004/0255244 A1* | 12/2004 | Filner | G06F 17/211 | 715/253 |
| 2005/0097458 A1* | 5/2005 | Wilson | G06F 17/243 | 715/252 |
| 2006/0085743 A1* | 4/2006 | Baudisch | G06F 17/212 | 715/273 |
| 2006/0107205 A1* | 5/2006 | Makela | G06F 17/30905 | 715/246 |
| 2006/0195784 A1* | 8/2006 | Koivisto | G06F 17/212 | 715/234 |
| 2006/0227153 A1* | 10/2006 | Anwar | G06T 3/0012 | 345/660 |
| 2009/0031206 A1* | 1/2009 | Aureglia | G06F 17/246 | 715/217 |
| 2009/0067753 A1* | 3/2009 | Hanechak | G06T 3/0006 | 382/298 |
| 2009/0183068 A1* | 7/2009 | Bard | G06F 17/30905 | 715/252 |
| 2009/0315917 A1* | 12/2009 | Uehori | G06T 3/4092 | 345/668 |
| 2009/0319888 A1* | 12/2009 | Oygard | G06F 17/211 | 715/252 |
| 2011/0122155 A1* | 5/2011 | Zechlin | G06F 17/30905 | 345/660 |
| 2011/0161806 A1* | 6/2011 | Stern | G06F 17/211 | 715/247 |
| 2011/0167353 A1* | 7/2011 | Grosz | G06F 17/3028 | 715/738 |
| 2011/0249299 A1* | 10/2011 | Wu | G06K 9/2063 | 358/3.26 |
| 2012/0044267 A1* | 2/2012 | Fino | G09G 5/24 | 345/667 |
| 2012/0089942 A1* | 4/2012 | Gammon | G06F 3/048 | 715/784 |
| 2012/0096344 A1* | 4/2012 | Ho | G06F 17/211 | 715/249 |
| 2013/0187926 A1 | 7/2013 | Silverstein et al. | | |
| 2014/0208197 A1* | 7/2014 | Ellis | G06F 17/212 | 715/234 |
| 2014/0267438 A1* | 9/2014 | Sosinski | G06T 3/4092 | 345/666 |
| 2014/0365955 A1* | 12/2014 | DeLuca | G06F 3/0481 | 715/788 |
| 2014/0372874 A1* | 12/2014 | Marseille | G06F 17/212 | 715/243 |
| 2015/0110915 A1* | 4/2015 | Tamura | B29C 49/46 | 425/524 |
| 2015/0309720 A1* | 10/2015 | Fisher | G06F 3/04845 | 715/752 |
| 2016/0124910 A1* | 5/2016 | Nordback | G06F 17/212 | 715/229 |
| 2016/0132470 A1* | 5/2016 | Imana | G06F 17/217 | 715/251 |
| 2016/0140250 A1* | 5/2016 | Wang | G06F 17/30905 | 715/238 |

OTHER PUBLICATIONS

Huang, Weihua, et al., "A System for Understanding Imaged Infographics and Its Applications", In Proceedings of the 2007 ACM symposium on Document engineering (2007), pp. 9-18.

Savant, Avni, "Power of Infographics using SAP Lumira", retreived from http://scn.sap.com/community/lumira/blog/2014/06/09/powerofinfographicswithsaplumira, Jun. 9, 2014, 7 pages.

* cited by examiner

US 10,133,463 B2

SMART RESPONSIVE BEHAVIOR FOR PIXEL-PERFECT DESIGNS

TECHNICAL FIELD

This description relates to smart responsive behavior for pixel-perfect designs.

BACKGROUND

Existing design frameworks may not deal with original proportions. That is, a design that is created using a design framework may not scale properly and/or may not retain its original proportions when rendered on different devices.

SUMMARY

According to one general aspect, a computer-implemented method for rendering a document on any size device includes, during runtime, rendering a document for display on a device, where the document includes multiple elements arranged in one or more rows and one or more columns. The method includes if a size of the device is greater than a threshold size, scaling the document as a whole to fit the size of the device. If the size of the device is less than the threshold size, scaling the document by stacking the columns containing elements into a single column, removing empty space from the single column, and scaling the elements in the stacked single column.

In another general aspect, a computer program product for rendering a document on any size computing device is tangibly embodied on a non-transitory computer-readable storage medium and includes instructions that, when executed by at least one computing device, are configured to cause the at least one computing device to, during runtime, render a document for display on the computing device, where the document includes multiple elements arranged in one or more rows and one or more columns. if a size of the computing device is greater than a threshold size, the document is scaled as a whole to fit the size of the computing device. If the size of the computing device is less than the threshold size, the document is scaled by maintaining absolute positioning of the elements within a column and maintaining a ratio between the elements within a row.

In another general aspect, a system for rendering a document on any size computing device includes at least one memory including instructions and at least one processor that is operably coupled to the at least one memory and that is arranged and configured to execute the instructions that, when executed, cause the at least one processor to implement a visual editor, a model design application, and a responsive infographic module. The visual editor is configured enable a user to create one or more elements. The model design application is configured to enable the user to create an infographic using the elements and to convert the infographic into an infographic model, where the infographic model includes the elements arranged in one or more rows and one or more columns. The responsive infographic module is configured to execute within a browser application and to, during runtime, render the infographic for display on the computing device. If a size of the computing device is greater than a threshold size, the responsive infographic module scales the infographic as a whole to fit the size of the computing device. If the size of the computing device is less than the threshold size, the responsive infographic module scales the document by maintaining absolute positioning of the elements within a column and maintaining a ratio between the elements within a row.

DETAILED DESCRIPTION

This document describes a system and techniques for designing and rendering a pixel-perfect document such as, for example, an infographic, that when rendered on different devices of different shapes and sizes, maintains the original intent of the designer. That is, the elements within the document maintain absolute positioning within a column and the elements within the document maintain their ratio relative to one another within a row and thus within a column. In this manner, the elements within the document maintain their proportions and ratios relative to one another on computing devices with a large display and on computing devices with a small display.

Figure 1:
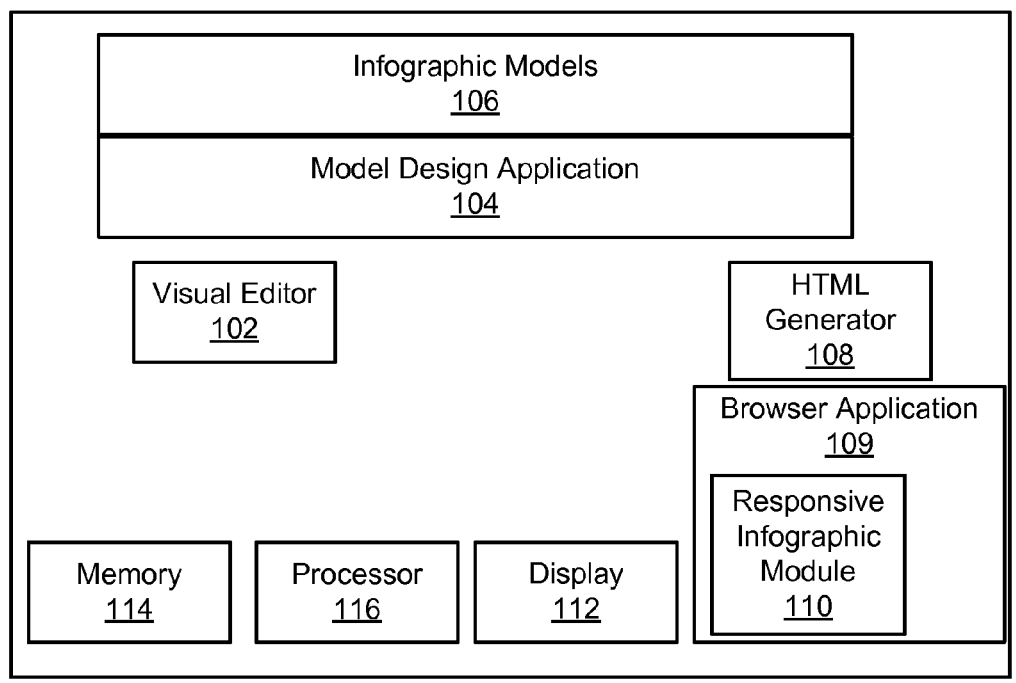
FIG. 1 is a block diagram of a system for designing and rendering a pixel-perfect design.

FIG. 1 is a block diagram of a system 100 for designing and rendering a pixel-perfect document. The system 100 may be implemented on a computing device such as a desktop computer, a server, a laptop computer, a tablet, a smart phone or any other type of computing device. While the system 100 includes functions for both designing and rendering pixel-perfect documents, it is understood that the system 100 may be implemented across multiple computing devices. For example, one computing device may be configured to enable design of the document and a different computing device may be configured to render the document to fit the size of the display for the device its being rendered on.

The system 100 includes a visual editor 102. The visual editor 102 may be implemented as an application that enables users to design and create elements for use in a document. The visual editor 102 is an application tool to create visual and textual elements, where the visual and textual elements may be representative of some underlying data. For example, the visual editor 102 enables the creation of pictograms, data points, text, graph and other elements.

The system 100 includes a model design application 104. The model design application 104 is an application that enables a user to create documents using the elements created using the visual editor 102. The model design application 104 enables a user to create documents, including infographics. An infographic is a document that includes multiple text elements and/or graphic elements, which may represent complex data, to convey information to a viewer. The elements of an infographic may include data, pictograms, data points, text, graphs and other elements, where the elements may depict and describe a representation of some underlying data. The elements may first be created using the visual editor 102 and then the elements may be arranged into an infographic using the model design application 104.

Figure 2:
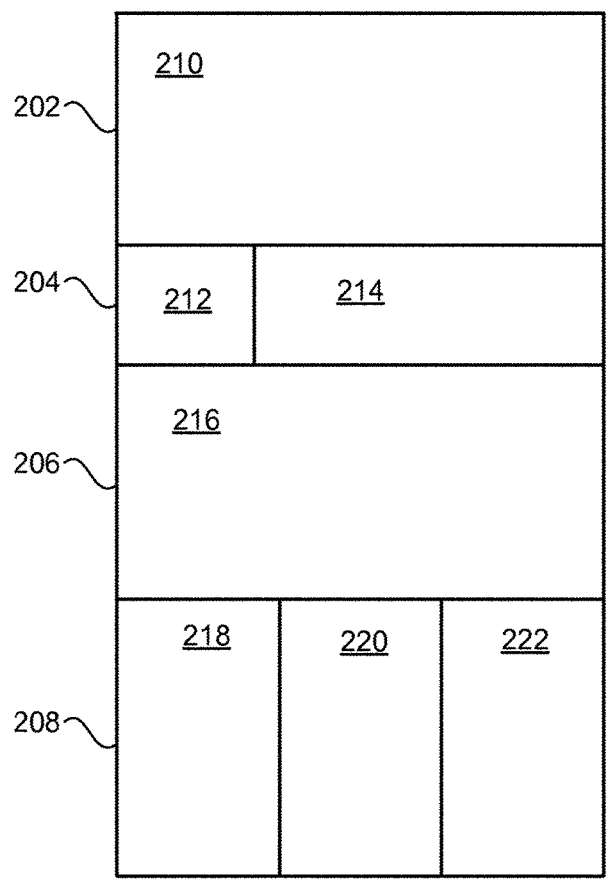
FIG. 2 is an example schematic of an infographic.

The model design application 104 may use a grid layout to enable the user the drag and drop elements onto the grid and to arrange the elements in a desired arrangement on the grid. Referring also to FIG. 2, an example infographic 200 is illustrated. An infographic may be composed of several pages. The infographic 200 includes a single page. Each page of the infographic 200 has at least one row. In this example, the infographic 200 includes four rows 202, 204, 206 and 208.

A row is composed of one or more columns. In this example, row 202 includes a single column 210. Row 204 includes two columns 212 and 214. Row 206 includes a single column 216. Row 208 includes three columns 218, 220 and 222. Further, each column may include one or more tiles.

Figure 3:
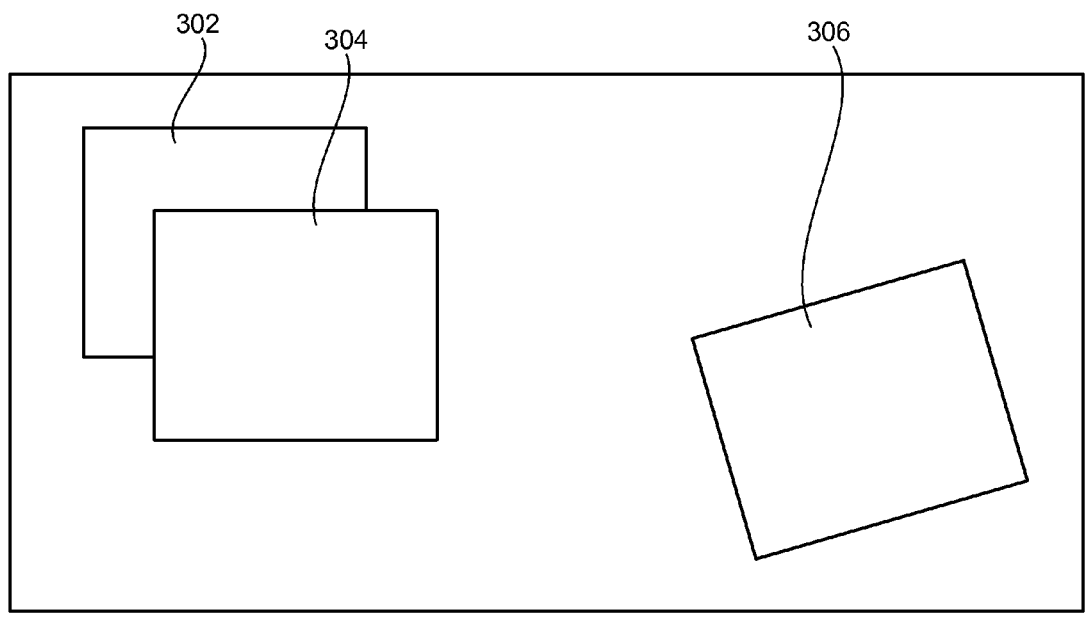
FIG. 3 is an example schematic of a column from the infographic of FIG. 2.

Referring to FIG. 3, an example column 210 from FIG. 2 is illustrated. The column 210 is illustrated with three tiles 302, 304 and 306. The tiles 302, 304 and 305 may also be referred to as the elements of the infographic, where the tiles include the visuals created using the visual editor 102. The tiles (or elements) 302, 304 and 306 may be arranged within the column 210 in any order and/or orientation. The tiles may be dragged and dropped and moved around within the column by the designer.

Referring back to FIG. 1, the model design application 104 uses the grid layout of pages, rows and columns to convert the infographic layout created by the user into an infographic model 106. The infographic model 106 defines the infographic in terms of the spatial orientation of the elements and the positioning of the elements within specific rows and columns on a page as designed by the user. The infographic model 106 may be implemented as a file that can be rendered for display on any computing device. The infographic model 106 is compiled such that when it is rendered on a device, the infographic model 106 may be scaled up in size or scaled down in size to fit the size of the device. When the infographic model 106 is scaled, the absolute positioning of the elements within a column is maintained and the ratio between elements within a row (and thus within a column) is maintained.

The system 100 includes a hypertext markup language (HTML) generator 108. The HTML generator 108 is configured to build the HTML structure of the infographic. The HTML generator 108 also is configured to perform one or more optional pre-computations regarding the infographic to enable faster scaling when rendering the infographic on a computing device, as discussed in more detail below.

The responsive infographic module 110 is configured to run in a browser application 109. The responsive infographic module 110 is configured to read the infographic model 106 and to render the infographic model 106 for display on a computing device. The responsive infographic module 110 is configured to implement responsive rules when executing and rendering the infographic model 106 such that a responsive infographic 110 is realized on a display 112.

The responsive infographic module 110 may apply the following rules when rendering the infographic model 106 on a device based on a size of the device. When rendering the infographic model 106 on a large device, the responsive infographic module 110 scales the infographic up or down in size as a whole to the device in width. A large device may be defined as a device, where the size of the device is greater than a threshold size. When rendering the infographic model 106 on a small device, the responsive infographic module 110 scales the infographic up or down in a manner to maintain the absolute positioning of the elements within a column and maintain a ratio between the elements within a row. A small device may be defined as a device, where the size of the device is less than a threshold size.

On the small device, to maintain the absolute positioning of the elements within a column and to maintain the ratio between the elements within a row, the responsive infographic module 110 may perform the following steps. The responsive infographic module 110 stacks the columns containing elements in a single column, removes empty space from the single column and scales the elements (either up or down in size) in the stacked single column.

More specifically, in one implementation, the size of the device may be defined in terms of the width of a display for the device in terms of a number of pixels. The threshold size may be defined in terms of a number of pixels.

Figure 4:
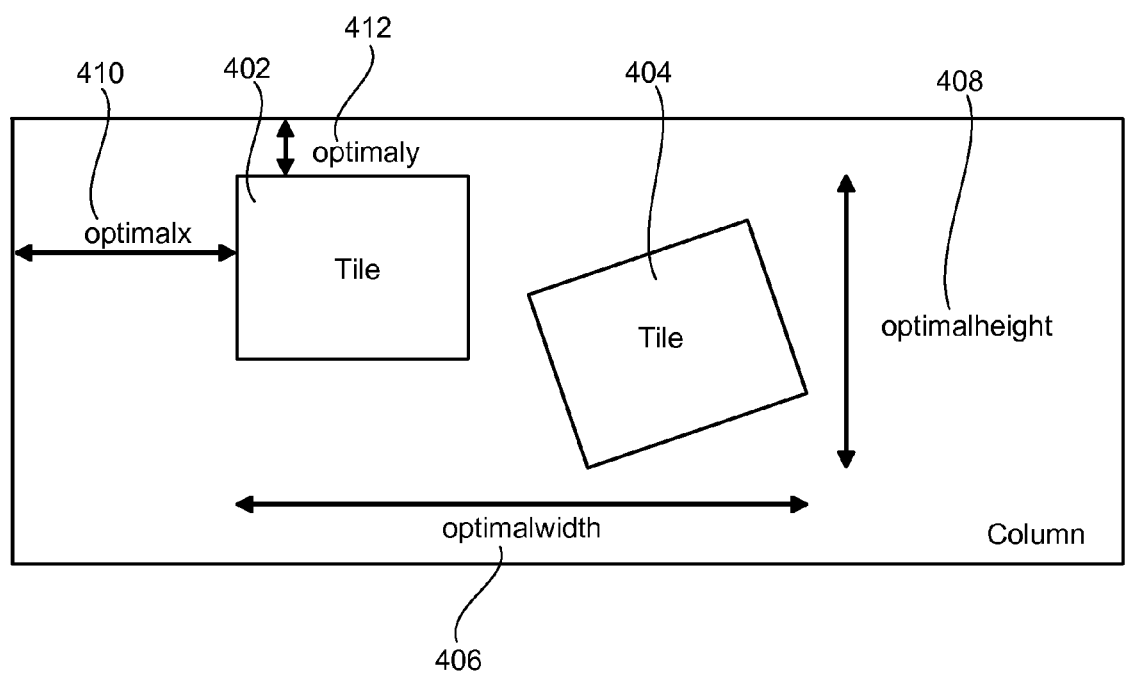
FIG. 4 is an example schematic of a column from the infographic of FIG. 2.

The HTML generator 108 may be configured to compute the empty space values (or white space values) for each column. Referring to FIG. 4, an example schematic of a column 216 from FIG. 2 is illustrated. The column 216 includes two tiles (or elements) 402 and 404. The HTML generator 108 is configured to compute the empty space for each column by calculating the optimal width 406 and the optimal height 408. The HTML generator 108 is also configured to compute the optimal x 410 and the optimal y 412. In one implementation, the HTML generator 108 may pre-compute these values for the infographic model 106 in order to speed up the rendering of the infographic model during runtime. These computed static values can be used by the responsive infographic module 110 when scaling up or scaling down the infographic or portions of the infographic when rendering the infographic on devices having different sizes.

The responsive infographic module 110 also may be configured to determine if the column contains a single element (or tile) that is only text. The responsive infographic module 110 also may use this information when rendering and scaling the infographic. When a page is loaded the responsive infographic module 110 may store the infographic design-time width before performing any scaling operations. When a page has already been loaded and is being re-sized, the responsive infographic module 110 may perform the scaling operations.

Figure 5:
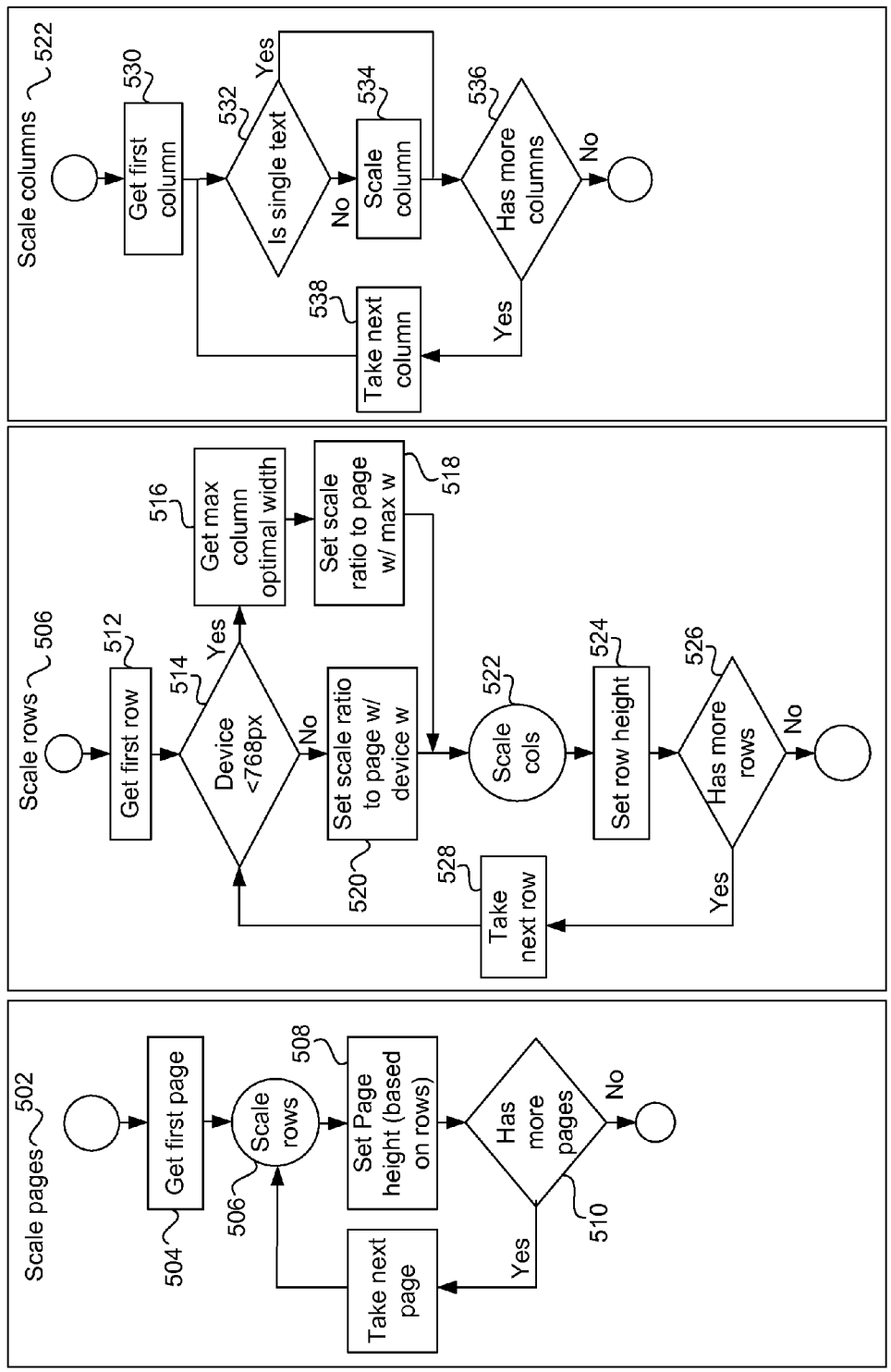
FIG. 5 is a flowchart illustrating example operations of the system of FIG. 1 for scaling an infographic.

Referring to FIG. 5, an example process 500 illustrates example operations of the system 100 of FIG. 1 for rendering an infographic on any size computing device. Process 500 includes scaling the pages of the infographic (502). The responsive infographic module 110 gets the first page (504) and then scales the rows for the first page (506). Scaling the rows is discussed in more detail below. After the rows have been scaled (506), which includes the process for scaling the columns, the page height is set (508). The page height is set based on the rows. Then, the responsive infographic module 110 determines if the infographic has more pages (510). If there are no more pages, then the process ends and the infographic has been properly sized and scaled based on the size of the display on the device its being rendered. If there are more pages, then the process goes back to scaling the rows (506) and continues on until there are no more pages in the infographic.

Scaling the rows (506) is described in more detail below. As part of scaling the rows (506), the responsive infographic module 110 gets the first row (512) and determines the width of the device in relation to a threshold size (514). In this example, the threshold size is 786 pixels. It is understood that the threshold size may be configurable and can be set to other dimensions and can be determined using other units.

If the device is below the threshold size, then the responsive infographic module 110 gets the maximum column optimal width (516). The scale ratio is set to page width divided by the maximum column width (518). In this manner, for smaller devices the ratio of elements within the row remains the same.

If the device is above the threshold size, then the responsive infographic module 110 sets the scale ratio to the page width divided by the device width (520). After the scale ratios have been set, then the columns are scaled (522). The scaling of the columns is discussed in more detail below. After the columns are scaled, the row height is set (524). The responsive infographic module 110 determines if there are more rows (526) and if there are no more rows, then the scaling of the rows (506) is complete. If there are more rows, then the next row is taken (528) and is scaled by following the process again.

Scaling the columns (522) is described in more detail below. As part of scaling the columns, the responsive infographic module 110 gets the first column (530). The responsive infographic module 110 determines if the column contains single text (532). That is, the determination is made as to whether there is a single element in the column and the element is text only. If the column does not contain single text, then the column is scaled (534). If the column does contain single text, then the column is not scaled and the process advances to determine whether there are more columns (536). If the column contains a single element of text, then the text element may be wrapped without scaling the text element.

As part of scaling the columns (534), the responsive infographic module 110 stacks the columns and removes all empty space from the columns. Then, the column is scaled up or down to fit the device. If there are no more columns, then the scaling of the columns is complete. If there are more columns, then the next column is taken (538) and the process repeats itself.

Figure 6:
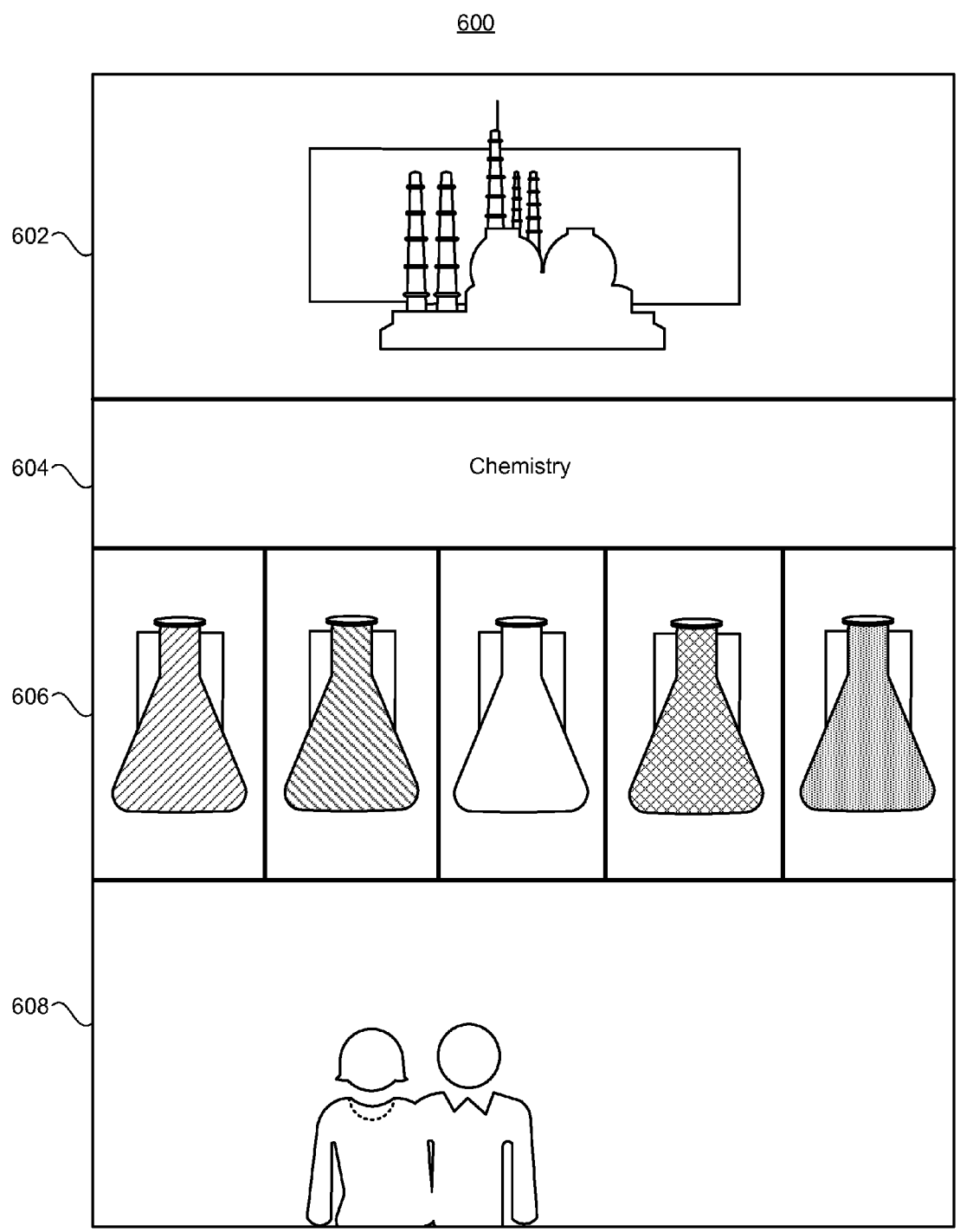
FIG. 6 is an example schematic of an infographic.

Referring to FIG. 6, an example infographic 600 is illustrated. The infographic 600 includes four rows 602, 604, 606 and 608. The first row 602 includes a single column with a graphical element. The second row 604 includes a single element in a single column with text only. The third row 606 includes five columns with each column including a single graphical element. The fourth row 608 includes a single column with a single graphical element.

The infographic 600 may be designed using the visual editor 102 and the model design application 104 of FIG. 1. The model design application 104 may have converted the infographic 600 into an infographic model. The responsive infographic module 110 may render the infographic 600 using a browser application 109. In this example, the infographic 600 may be an example of an infographic that is regular size or has been scaled to a larger size to fit larger size computing device.

Figure 7:
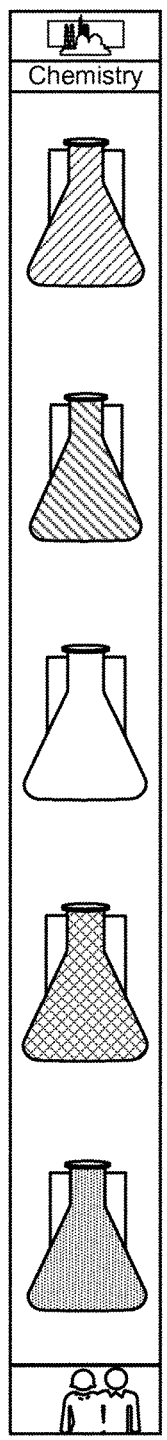
FIG. 7 is an example schematic of the infographic of FIG. 6 as scaled for a smaller sized computing device.

Referring to FIG. 7, the infographic 700 is the same infographic 600 of FIG. 6 that has been scaled by the responsive infographic module 110 for a smaller size device. All of the columns have been stacked into a single column and the elements within the columns, other than the single text element, have been scaled to maintain their size and ratios relative to one another.

Referring back to FIG. 1, the system 100 includes at least one memory 114 and at least one processor 116, where the memory 114 may be a non-transitory computer-readable storage medium. Thus, the at least one processor 116 may represent two or more processors executing in parallel, and a non-transitory computer-readable storage medium 114 may represent virtually any non-transitory medium that may be used to store instructions for executing the components of system 100. Multiple processors also may be referred to as multi-core processors or multi-processor core environment. The processor 116 may be a hardware processor, including a micro-processor.

The at least one processor 116 may be configured to execute instructions stored on the computer-readable storage medium 114 that, when executed, cause the at least one processor 116 to implement the visual editor 102, the model design application 104, the HTML generator 108 and the responsive infographic module 110.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer-implemented method for rendering a document on any size device including executing instructions stored on a non-transitory computer-readable storage medium, the method comprising:
    during runtime, rendering a document for display on a device having a display, wherein the document includes multiple elements arranged in one or more rows and one or more columns;
    if a size of the display is greater than a threshold size, scaling the document as a whole to fit the size of the display by setting and using a scale ratio to a page width of the document divided by a width of the display; and
    if the size of the display is less than the threshold size, scaling the document by:
        setting the scale ratio to the page width of the document divided by a maximum column width;
        stacking the columns containing elements into a single column,
        removing empty space from the single column,
        scaling the elements in the stacked single column,
        wrapping text without scaling the text for an element that only contains text,
        maintaining absolute positioning of the elements within the single column, and
        maintaining a ratio between the elements within a row using the scale ratio.

2. The computer-implemented method of claim 1 further comprising computing the empty space for each of the columns.

3. The computer-implemented method of claim 2 wherein computing the empty space comprises computing an optimal height and an optimal width relative to a size of each of the columns.

4. The computer-implemented method of claim 1 wherein the document is an infographic.

5. A computer program product for rendering a document on any size computing device, the computer program product being tangibly embodied on a non-transitory computer-readable storage medium and comprising instructions that, when executed by at least one computing device, are configured to cause the at least one computing device to:
    during runtime, render a document for display on a display of the computing device, wherein the document includes multiple elements arranged in one or more rows and one or more columns;
    if a size of the display is greater than a threshold size, scale the document as a whole to fit the size of the display by setting and using a scale ratio to a page width of the document divided by a width of the display; and
    if the size of the display is less than the threshold size, scale the document by:
        setting the scale ratio to the page width of the document divided by a maximum column width;
        stacking the columns containing elements into a single column,
        removing empty space from the single column,
        scaling the elements in the stacked single column,
        wrapping text without scaling the text for an element that only contains text, and
        maintaining absolute positioning of the elements within a column and maintaining a ratio between the elements within a row using the scale ratio.

6. The computer program product of claim 5 wherein the instructions include instructions that, when executed by the computing device, are configured to cause the computing device to compute the empty space for each of the columns.

7. The computer program product of claim 6 wherein computing the empty space includes instructions that, when executed by the computing device, are configured to cause the computing device to compute an optimal height and an optimal width relative to a size of each of the columns.

8. The computer program product of claim 5 wherein the document is an infographic.

9. A system for rendering a document on any size computing device, the system comprising:
    at least one memory including instructions; and
    at least one processor that is operably coupled to the at least one memory and that is arranged and configured to execute the instructions that, when executed, cause the at least one processor to implement a visual editor, a model design application, and a responsive infographic module, wherein:
    the visual editor is configured enable a user to create one or more elements;
    the model design application is configured to enable the user to create an infographic using the elements and to convert the infographic into an infographic model, wherein the infographic model includes the elements arranged in one or more rows and one or more columns; and
    the responsive infographic module is configured to execute within a browser application and to:
    during runtime, render the infographic for display on a display of the computing device;
    if a size of the display is greater than a threshold size, scale the infographic as a whole to fit the size of the display by setting and using a scale ratio to a page width of the document divided by a width of the display; and
    if the size of the display is less than the threshold size, scale the infographic by:
        setting the scale ratio to the page width of the document divided by a maximum column width;
        stacking the columns containing elements into a single column, removing empty space from the single column,
scaling the elements in the stacked single column,
wrapping text without scaling the text for an element that only contains text, and
maintaining absolute positioning of the elements within a column and maintaining a ratio between the elements within a row using the scale ratio.

10. The system of claim 9 wherein the at least one processor is further configured to execute the instructions that, when executed, cause the at least one processor to implement a hypertext mark-up language (HTML) generator, wherein the HTML generator is configured to compute the empty space for each of the columns.

11. The system of claim 10 wherein computing the empty space includes computing an optimal height and an optimal width relative to a size of each of the columns.

12. The system of claim 9 wherein the model design application converts the infographic into an infographic model using a grid to identify the rows and the columns that contain elements of the infographic.

* * * * *